United States Patent [19]

Frankenburg et al.

[11] Patent Number: 4,569,088
[45] Date of Patent: Feb. 11, 1986

[54] FOUNDRY WORKERS' PROTECTIVE GARMENT

[75] Inventors: Peter E. Frankenburg; Herbert G. Lauterbach, both of Wilmington, Del.

[73] Assignee: E. I. Du Pont de Nemours and Company, Wilmington, Del.

[21] Appl. No.: 538,272

[22] Filed: Oct. 3, 1983

[51] Int. Cl.[4] ............................................. A41D 13/00
[52] U.S. Cl. ............................................. 2/81; 2/167
[58] Field of Search ..................... 2/81, 167; 28/107

[56] References Cited

U.S. PATENT DOCUMENTS

| | | | |
|---|---|---|---|
| 2,840,881 | 7/1958 | Bateman | 28/107 X |
| 3,691,564 | 9/1972 | Marre et al. | 2/81 |
| 4,034,417 | 7/1977 | Ellis | 2/81 |
| 4,454,611 | 6/1984 | Tschirch | 2/167 X |

FOREIGN PATENT DOCUMENTS 2011244  7/1979  United Kingdom ..................... 2/81

OTHER PUBLICATIONS

IBM Technical Disclosure Bulletin, vol. 8, No. 4, Sep. 1965.

*Primary Examiner*—Louis K. Rimrodt

[57] ABSTRACT

A garment for protection against molten metals is constructed of a composite fabric having an area weight of no more than 1000 g/m² comprised of an outer layer which is a visually continuous, optically opaque sheet of poly(tetrafluoroethylene) fibers having an area weight of at least 170 g/m² securely attached throughout its interface with an inner durable fabric layer of non-fusible, textile fibers having an area weight of 70–700 g/m².

8 Claims, 2 Drawing Figures

F I G. 2
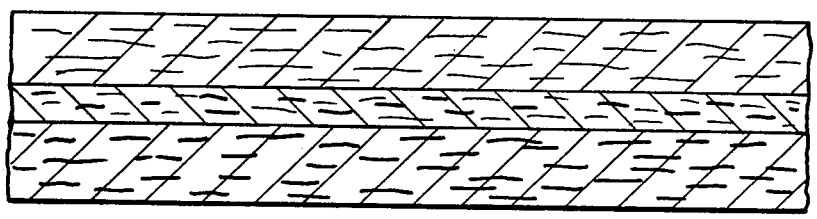

4,569,088

FOUNDRY WORKERS' PROTECTIVE GARMENT

DESCRIPTION

This invention relates to protective garments for foundry workers comprised of a continuous poly(tetrafluoroethylene) fiber surface and a substrate fabric of non-fusible textile fibers.

Foundry workers and others who work with molten metal require garments which protect not only from the high temperatures encountered in their work areas but also from occasional splashes of molten metal, particularly high-melting metals such as aluminum and iron. If the molten metal adheres to the garment, a great deal of heat is transferred through the garment to the wearer unless the fabric comprising the garment is so thick as to be excessively cumbersome and uncomfortable to wear.

U.S. Pat. No. 2,840,881 describes fibrous structures comprised of a surface layer of nonwoven, intermingled poly(tetrafluoroethylene) fibers and another layer of fibers other than poly(tetrafluoroethylene) fibers, at least some of the fibers of at least one layer extending into the other layer to bind the separate layers together. The structures are useful where a lubricating surface is required. Neither the shedding of molten metals nor usefulness in foundry workers' protective garments is suggested in U.S. Pat. No. 2,840,881.

This invention provides a foundry worker's protective garment which provides protection against both high temperatures and occasional splashes of molten metal while providing reasonable comfort to the wearer.

BRIEF DESCRIPTION OF THE INVENTION

This invention provides a garment for protection from high temperatures and occasional splashes of molten metal constructed of a drapeable, air-permeable composite fabric having an area weight of no more than 1000 $g/m^2$ comprised of an outer layer which is a visually continuous, optically opaque sheet of poly(tetrafluoroethylene) fibers having an area weight of at least 170 $g/m^2$ securely attached throughout its interface with an inner durable fabric layer of infusible textile fibers having an area weight of 70 to 700 $g/m^2$. Preferably the sheet of poly(tetrafluoroethylene) fibers is a needled batt having an area weight of at least 250 $g/m^2$. The sheet of poly(tetrafluoroethylene) fibers may be a waterleaf made on a paper machine. Preferably the layers are securely attached throughout their interface by mechanical needling through the poly(tetrafluoroethylene) fiber layer into the durable fabric layer but optionally may be attached by hydraulic needling in the same direction. Preferably the inner fabric layer is comprised of fibers selected from the group consisting of poly(m-phenylene isophthalamide) fibers, poly(p-phenylene terephthalamide) fibers or a blend of 3–50% by weight of poly(p-phenylene terephthalamide) fibers and 50–97% by weight of poly(m-phenylene isophthalamide) fibers.

BRIEF DESCRIPTION OF THE DRAWING

FIG. 2 is a diagrammatic illustration of a batt 3 of totally self entangled poly(m-phenylene isophthalamide) having a visually continuous, optically opaque surface layer 1 of poly(tetrafluoroethylene) totally self entangled and a middle portion 2 of poly(tetrafluoroethylene) hydrolaced into poly(m-phenylene isophthalamide).

DETAILED DESCRIPTION OF THE INVENTION

Figure 1:
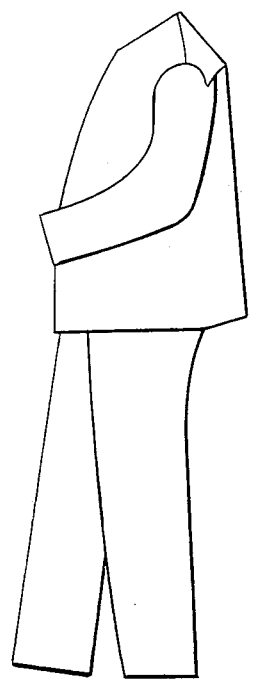
FIG. 1 illustrates a protective garment according to the invention.

It is essential that the surface sheet of poly(tetrafluoroethylene) fibers presents a closed surface so that intrusion of molten metal, when splashed on the garment, cannot occur. The terms "visually continuous" and "optically opaque" describe such a surface. The surface will be smooth with no openings which would permit intrusion of splashed molten metal. Sufficient needling, either mechanical or hydraulic, of a uniform layer of poly(tetrafluoroethylene) fibers will provide such a surface. When properly constructed the surface will readily shed molten metals such as molten aluminum and iron.

It is further essential that only poly(tetrafluoroethylene) fibers be present on the surface of the garment, since other fibers will encourage sticking of molten metal to the surface of the garment or ignite with consequent harm to the wearer.

Since the garment of the present invention will be exposed to considerable heat, the inner durable fabric layer should be dimensionally stable to heat and preferably should be non-flammable, i.e., will not support combustion in air. The inner fabric layer may be either a woven fabric or a nonwoven batt which has been mechanically or hydraulically needled or a knit fabric, e.g., double knit. The inner fabric will ordinarily have a lower area weight than the outer poly(tetrafluoroethylene) fiber sheet and typically will be about 150 $g/m^2$.

The composite fabric comprising the garment is preferably heat set at high temperature, e.g., 290° C. to provide dimensional stability.

By non-fusible fibers is meant fibers which will not leave a molten trail on a hot surface at 300° C.

By "visually continuous" is meant that no fibers in the inner layer can be seen when viewing the composite fabric from the face of the outer layer.

By "optically opaque" is meant that no holes can be seen in the poly(tetrafluoroethylene) fiber sheet when the composite fabric is held up before a light.

The word "garments" is meant to include jackets, aprons, leggings, hoods, coats, pants, gloves and shoes including overshoes.

Preferred non-fusible textile fibers are the aromatic polyamide (aramid) fibers such as poly(m-phenylene isophthalamide) and poly(p-phenylene terephthalamide) fibers. Other useful non-fusible textile fibers include textile fiberglass and flame-proofed wool, acrylic fibers, and cellulosic fibers.

The protective garments of this invention are particularly effective in protecting against splashes of molten metals of relatively high melting point, especially molten aluminum and iron, which do not adhere to the poly(tetrafluoroethylene) surface of the garments. The protective garments may need to be made of composite fabrics of relatively high basis weight if they are required to protect also against such low-melting metals as tin and lead. Although they contain less heat to transmit than molten metals of higher melting point, molten tin and lead solidify upon contact with almost any garment, including the garments of the invention, so that the garments have to be heavy enough (e.g., up to 1000 $g/m^2$) to protect against the heat from the solidified metal as it cools.

Conventional needle looms may be used to provide mechanical needling. Hydraulic needling may be carried out as shown in U.S. Pat. No. 4,233,349.

MOLTEN ALUMINUM SPLASH TEST

A 19 cm×36 cm (7.5 in×14 in) sample of the fabric to be tested is cut and mounted on a sensor board made of an extremely heat resistant, insulating material of good integrity (e.g., "Marinite XL", a commercially available cement board), with the long dimensions of the sensor board and of the fabric at a 70° angle from the horizontal. Two copper calorimeters are mounted in the sensor board, one positioned behind the upper part of the fabric sample, 10 cm (4 in) below the top of the fabric on its centerline; and one behind the lower part of the sample, 20 cm (8 in) below the top of the fabric. Heat transfer through the fabric sample is measured by the calorimeters and recorded, with separate curves for each calorimeter, as total heat in cal/cm$^2$.s on a strip chart.

An induction furnace, mounted to be rotated through a 110° arc so as to discharge molten metal through a distance of 46 cm (18 in) upon the upper part of the fabric mounted on the sensor board, is charged with 900 g (2 pounds) of aluminum pellets and heated to melt the pellets. When the temperature of the aluminum reaches 760° C.±15° C. (1400° F.±25° F.), the strip chart for recording sensor heat transfer is started and the molten aluminum is discharged onto the fabric sample over a period of 1.5 seconds. The recording of the curves on the strip chart is continued for 30 seconds after the molten aluminum is discharged.

The protective performance of the test specimen is determined by comparing the heat transferred to the two sensors with that which can be tolerated by human tissue. A transparency of a standard curve which represents the exposure energy which would cause a second degree burn in human tissue is prepared using the procedure described in ASTM Designation: D4108-82, using the Total Heat values of Table I. This curve is placed on top of and aligned with the strip chart to compare the relative positions of the heat transfer and the human tissue tolerance. If the amount of heat indicated by both sensors on the strip chart recorder is less than the standard curve during the 30 seconds, the fabric sample is rated as "Passed". If the heat from either sensor equals or exceeds the standard curve (i.e., if either recorded curve reaches or crosses the standard curve), the fabric sample is rated as "Failed".

AIR PERMEABILITY (FRAZIER AIR PERMEABILITY)

Air permeability of a fabric sample, a measure of its "breathability", is measured in sccordance with ASTM Designation: D737-75. The Air Permeability Value is reported as a number which has the units of ft$^3$/ft$^2$.min for a pressure differential of 0.5 in. of water. This value is multiplied by 0.508 to obtain the corresponding metric value, which has the units of cm$^3$/cm$^2$.s for a pressure differential of 12.7 mm of water. For the purpose of this invention, the term "air-permeable" is defined as having a permeability of at least 5 ft$^3$/ft$^2$.min of 2.5 cm$^3$/cm$^2$.s.

EXAMPLE I

Poly(tetrafluoroethylene) (PTFE) staple fibers having a linear density of 7.4 dtex (6.7 dpf) and a cut length of 11.4 cm (4.5 in.) were carded to form a thin web, which was cross-lapped onto a moving belt to form a batt of PTFE staple fibers. The batt had a basis weight of 278 g/m$^2$ (8.2 oz/yd$^2$).

A yarn having a linear density of 197 dtex (30/2 cotton count) was made by conventional methods from a commercially available blend of aramid staple fibers of 95 parts by weight of poly(metaphenylene isophthalamide) fibers of 1.9 dtex (1.7 dpf) and a cut length of 5.1 cm (2.0 in.) and 5 parts by weight of poly(paraphenylene terephthalamide) fibers of 1.7 dtex (1.5 dpf) and a cut length of 5.1 cm. The yarn was woven into a plain weave fabric having a construction of about 18×18 ends per cm (45×45 ends per in.) and a basis weight of 153 g/m$^2$ (4.5 oz/yd$^2$).

The batt of PTFE staple fibers was superimposed over the plain weave fabric of blended aramid staple fibers and the superimposed batt and fabric were passed twice through a commercial needle loom (Fehrer loom, made by Dr. Ernst Fehrer, A. G. Linz, Austria) equipped with fine needles, each having three medium barbs (Singer needles having the identification number 4140 811 050). The total number of needle penetrations after the two passes was 775 penetrations per square centimeter (5000 penetrations per square inch). The needle-punching was performed only into the face of the PTFE batt. In the resulting composite fabric, the PTFE fibers were securely anchored into the aramid woven fabric. None of the aramid woven fabric could be seen when viewing the composite fabric from the PTFE fiber face.

Samples of the composite fabric so prepared were subjected to the Molten Aluminum Splash Test. The composite fabric samples passed this test. The composite fabric had an air permeability value of 57 ft$^3$/ft$^2$. min.

Six jackets and two aprons were prepared from the composite fabrics. These garments were wear-tested at three commercial aluminum plants in the southern United States. The aluminum workers evaluated the test garments in comparison with incumbent aluminized rayon or leather control garments by wearing the test and control garments alternately every other day for a period of up to 30 days. Some of the wearers of both control and test garments experienced splashes of molten aluminum during these tests. Wearers unanimously preferred the test garments over the control garments because of the greater comfort and lighter weight of the test garments, coupled with their acceptable performance in molten aluminum splash protection of the wearers of the garments.

COMPARATIVE EXAMPLE

A batt, consolidated by hydraulic needling and having a basis weight of 295 g/m$^2$ (8.7 oz/yd$^2$), was formed from a blend of aramid staple fibers of 85 parts by weight of poly(metaphenylene isophthalamide) fibers of 1.9 dtex (1.7 dpf) and a cut length of 1.9 cm (0.75 in) and 15 parts by weight of poly(paraphenylene terephthalamide) fibers of 1.7 dtex (1.5 dpf) and a cut length of 1.9 cm (0.75 in).

A plain weave fabric having a basis weight of 159 g/m$^2$ (4.7 oz/yd$^2$) was formed from a yarn having a linear density of 197 decitex (30/2 cotton count) made from the same blend of aramid staple fibers used to make the yarn and plain weave fabric of Example I.

The consolidated batt of aramid staple fibers was superimposed on the plain weave fabric of aramid staple fibers and the superimposed batt and fabric were passed through a commercial needle loom to mechanically needle the batt to the fabric.

The composite fabric so prepared was subjected to the Molten Aluminum Splash Test. The molten aluminum adhered to the fabric surface and cooled below its melting point to form a sheet of solid aluminum on the fabric surface. The heat transfer measured by the calorimeters, as recorded on the curves on the strip chart, was sufficient to cause second degree burns. The fabric was rated as "Failed" in the Molten Aluminum Splash Test.

EXAMPLE II

Method for Preparing a Waterleaf of PTFE Fibers

The equipment comprised a laboratory sheet mold consisting of a "head box" to hold the slurry, a filter system to collect the fibers in the slurry, and a vacuum tank to permit rapid filtration of the slurry through the filter system. The filter system consisted of a 34 g/m$^2$ (1 oz/yd$^2$) nonwoven polyester fabric (Du Pont Reemay ® nonwoven polyester fabric) supported on a stainless steel screen having a mesh of about 39 wires per cm (100 wires per in).

In a typical run, a quantity of twenty liters (about 5.3 gal) of water containing 10 ml of a non-ionic surfactant (Rohm & Haas Triton X-100 dispersant) was added to the head box to cover the filter system with water. A vacuum of about 50 Torr (about 7 psi) was obtained in the vacuum tank. Separately, 16.9 g of 6.4 mm (0.25 in) long, 7.4 dtex (6.67 dpf) PTFE fiber were added to 3 liters of water in a laboratory high-speed blender (Waring blender) and stirred at moderate speed to disperse the fibers. To this mix were then added 0.5 g of the same non-ionic surfactant added to the water in the head box, 3 ml of a silicone emulsion antifoam agent (Dow "Antifoam B") and 1.5 g of polyvinyl alcohol (PVA) fibers (Kuron International VPB-104-2X-4) to act as a temporary binder material. The mix was then stirred for an additional 30 seconds, transferred to the head box of the sheet mold, and further dispersed by the addition of 25 liters (about 6.6 gal) of water. The slurry was then redispersed gently with a perforated paddle and allowed to stand about 10 seconds, after which a gate valve was opened to rapidly suck water through the filter system into the vacuum tank.

After vacuum removal of all standing water, the product (16.9 g PTFE fibers plus 1.5 g PVA fibers) on the nonwoven fabric filter was transferred to an oven and dried at 90° C. for 15 minutes. The resultant dried waterleaf was readily removed from the nonwoven fabric filter. It was trimmed to form a 30.5 cm × 30.5 cm (12 in × 12 in) waterleaf having a basis weight of 142 g/m$^2$ (5.0 oz/yd$^2$).

Preparation of the Composite Fabric

The equipment comprised a hydraulic needling machine of the type shown in FIG. 1 of U.S. Pat. No. 4,233,349 to D. O. Niederhauser. A 58.4 cm × 94 cm (23 in × 37 in) piece of 153 g/m$^2$ (4.5 oz/yd$^2$) plain weave fabric of yarns of the same blend of aramid staple fibers described in Example I was placed on a screen on a perforated belt support. The screen had a mesh of about 38 × 39 wires per cm (96 × 100 wires per in). A 160 g/m$^2$ (4.7 oz/yd$^2$) waterleaf of PTFE fibers was placed on top of the fabric, after which a 107 g/m$^2$ (3.16 oz/yd$^2$) waterleaf of PTFE fibers was placed on top of the first waterleaf. The sample (fabric surmounted by waterleaves) was thoroughly wetted, and the screen carrying the sample was then passed twice under hydraulic needling jets. The jet apparatus consisted of a 61 cm (24 in) long thin metal strip containing two rows of 0.13 mm (5 mil) holes spaced 15.75 holes per cm (40 holes per in) and supported 2.54 cm (1 in) above the screen. In the first pass the water jets were at a pressure of 10343 kPa (1500 psi), while in the second pass the jets were at a pressure of 13,790 kPa (2000 psi). The screen carrying the sample was then passed over a vacuum port to remove excess water, after which the product, a composite fabric of PTFE fibers hydraulically needled to an aramid woven fabric, was allowed to dry overnight and trimmed. PVA binder fibers present in the starting material waterleaves were washed out during the hydraulic needling process and were no longer present in the composite fabric product. The composite fabric was then cut in half and the two pieces of composite fabric were heat set on a heat setting frame at 300° C. for 15 minutes in an air oven.

One piece of the heat-set composite fabric had a basis weight of 434 g/m$^2$ (12.8 oz/yd$^2$), consisting of an outer layer of 278 g/m$^2$ (8.2 oz/yd$^2$) of PTFE fibers securely attached by hydraulic needling to the inner layer of 156 g/m$^2$ (4.5 oz/yd$^2$) of the aramid woven fabric. The composite fabric had an air permeability value of 33 ft$^3$/ft$^2$. min. The composite fabric was subjected to the Molten Aluminum Splash Test and readily passed the test.

We claim:

1. A protective garment for protection from molten metals comprised of a drapeable, air permeable composite fabric having an area weight of no more than 1000 g/m$_2$ and "passing" the Molten Aluminum Splash Test and constructed of a visually continuous, optically opaque outer layer of poly(tetrafluoroethylene) fibers having an area weight of at least 170 g/m$^2$ securely attached throughout its interface with an inner durable fabric layer of non-fusible textile fibers having an area weight of 70 g/m$^2$ to 700 g/m$^2$.

2. The garment of claim 1 wherein the sheet of poly(tetrafluoroethylene) fibers is a needled batt having an area weight of at least 250 g/m$^2$.

3. The garment of claim 1 wherein the sheet of poly(tetrafluoroethylene) fibers is a waterleaf made on a paper machine.

4. The garment of claim 1 wherein the outer layer and the inner layer of the fabric are attached by mechanical needling.

5. The garment of claim 1 wherein the outer layer and the inner layer of the fabric are attached by hydraulic needling.

6. The garment of claim 1 wherein the inner layer fabric is comprised of poly(m-phenylene isophthalamide) fibers.

7. The garment of claim 1 wherein the inner layer fabric is comprised of poly(p-phenylene terephthalamide) fibers.

8. The garment of claim 1 wherein the inner layer fabric is comprised of a blend of 3 to 50% by weight of poly(p-phenylene terephthalamide) fibers and 50 to 97% by weight of poly(m-phenylene isophthalamide) fibers.

* * * * *